US009250788B2

(12) United States Patent
Whiddett (10) Patent No.: US 9,250,788 B2
(45) Date of Patent: Feb. 2, 2016

(54) GESTURE HANDLERS OF A GESTURE ENGINE

(75) Inventor: Andrew F. Whiddett, Valencia, CA (US)

(73) Assignee: IdentifyMine, Inc., Tacoma, WA (US)

( * ) Notice: Subject to any disclaimer, the term of this patent is extended or adjusted under 35 U.S.C. 154(b) by 1184 days.

(21) Appl. No.: 12/406,957

(22) Filed: Mar. 18, 2009

(65) Prior Publication Data

US 2010/0241973 A1    Sep. 23, 2010

(51) Int. Cl.
| | | |
|---|---|---|
| *G06F 3/0488* | (2013.01) | |
| *G06F 3/01* | (2006.01) | |
| *G06F 3/0481* | (2013.01) | |

(52) U.S. Cl.
CPC .............. *G06F 3/0488* (2013.01); *G06F 3/017* (2013.01); *G06F 3/04883* (2013.01); *G06F 3/0481* (2013.01); *G06F 2203/0382* (2013.01)

(58) Field of Classification Search
CPC ............ G06F 3/017; G06F 2203/0382; G06F 3/0488; G06F 3/04883
USPC ......................................................... 715/863
See application file for complete search history.

(56) References Cited

U.S. PATENT DOCUMENTS

| 5,485,565 | A  * | 1/1996  | Saund et al. ................... 345/442 |
| 5,796,406 | A  * | 8/1998  | Shigematsu et al. .......... 715/863 |
| 5,798,758 | A  * | 8/1998  | Harada et al. ................. 715/863 |
| 5,809,267 | A  * | 9/1998  | Moran et al. ................... 715/863 |
| 6,057,845 | A  * | 5/2000  | Dupouy .......................... 715/863 |
| 6,075,895 | A  * | 6/2000  | Qiao et al. ..................... 382/218 |
| 6,195,104 | B1 * | 2/2001  | Lyons ............................ 345/473 |
| 6,307,545 | B1 * | 10/2001 | Conrad et al. ................. 715/781 |
| 6,502,136 | B1 * | 12/2002 | Higuchi et al. ................ 709/226 |
| 6,525,749 | B1 * | 2/2003  | Moran et al. ................... 715/863 |
| 6,578,036 | B1 * | 6/2003  | Lu et al. |
| 6,718,448 | B1 * | 4/2004  | Ofer .............................. 711/163 |
| 6,903,723 | B1 * | 6/2005  | Forest ........................... 345/157 |
| 7,036,077 | B2 * | 4/2006  | Saund et al. ................... 715/273 |
| 7,086,001 | B1 * | 8/2006  | Hicks et al. ................... 715/209 |
| 7,594,168 | B2 * | 9/2009  | Rempell ........................ 715/234 |
| 7,614,019 | B2 * | 11/2009 | Ribikauskas et al. ......... 715/863 |
| 7,886,236 | B2 * | 2/2011  | Kolmykov-Zotov et al. .. 715/863 |
| 7,978,181 | B2 * | 7/2011  | Westerman .................... 345/173 |
| 8,284,170 | B2 * | 10/2012 | Bernstein ............ G06F 3/04883 345/174 |
| 8,525,842 | B1 * | 9/2013  | Duluk et al. ................... 345/506 |
| 2001/0035855 | A1 * | 11/2001 | Komatsu et al. ............... 345/156 |
| 2002/0015064 | A1 * | 2/2002  | Robotham et al. ............. 345/863 |
| 2003/0016252 | A1 * | 1/2003  | Noy et al. ...................... 345/856 |
| 2004/0119744 | A1 * | 6/2004  | Chan .................. G06F 3/04842 715/763 |
| 2004/0189720 | A1 * | 9/2004  | Wilson et al. .................. 345/863 |
| 2004/0199813 | A1 * | 10/2004 | Hillman et al. ................. 714/13 |
| 2004/0199917 | A1 * | 10/2004 | Ofer et al. ...................... 718/100 |
| 2005/0054366 | A1 * | 3/2005  | Chen et al. ..................... 455/522 |
| 2005/0155034 | A1 * | 7/2005  | Jiang et al. ..................... 718/106 |
| 2005/0212757 | A1 * | 9/2005  | Marvit et al. .................. 345/156 |
| 2006/0001650 | A1 * | 1/2006  | Robbins ................ G06F 3/0421 345/173 |
| 2006/0010400 | A1 * | 1/2006  | Dehlin et al. ................. 715/856 |

(Continued)

*Primary Examiner* — Eric Wiener
(74) *Attorney, Agent, or Firm* — Steven C. Stewart (57) ABSTRACT

Techniques for manipulating graphic objects in response to gestures provided with a user interface device are disclosed. The technique includes indicating when a gesture associated with the graphics objects is to use a determined action. Others gestures are locked out from using the determined action with other graphic objects. Graphic objects are manipulated on the display based on the indication that the gesture associated with one of the graphics objects is to use the determined action.

11 Claims, 7 Drawing Sheets

(56) References Cited

U.S. PATENT DOCUMENTS

| | | | |
|---|---|---|---|
| 2006/0227116 A1* | 10/2006 | Zotov et al. | 345/173 |
| 2007/0171202 A1* | 7/2007 | Yang et al. | 345/158 |
| 2009/0006946 A1* | 1/2009 | Hanson et al. | 715/255 |
| 2009/0077501 A1* | 3/2009 | Partridge et al. | 715/846 |
| 2009/0100383 A1* | 4/2009 | Sunday et al. | 715/863 |
| 2009/0158088 A1* | 6/2009 | Hillman et al. | 714/11 |
| 2009/0244092 A1* | 10/2009 | Hotelling | G06F 3/0304 345/619 |
| 2009/0307660 A1* | 12/2009 | Srinivasan | 717/114 |
| 2009/0327974 A1* | 12/2009 | Abanami et al. | 715/863 |
| 2009/0327975 A1* | 12/2009 | Stedman | 715/863 |
| 2010/0050134 A1* | 2/2010 | Clarkson | 715/863 |
| 2010/0217872 A1* | 8/2010 | Martchenko | 709/227 |

* cited by examiner

GESTURE HANDLERS OF A GESTURE ENGINE

BACKGROUND

This application relates to manipulating graphic objects on a display in response to user generated gestures.

With the new range of hardware and software available, it has become possible to create interfaces that respond directly to touch. Specifically these new paradigms allow more than one touch to be processed at the same time—allowing for more natural navigation and commands. Examples of these emerging technologies are Microsoft Surface, the Apple iphone, and Windows 7 with a Multi-touch display (such as a HP Touchsmart).

While these technologies implement an API set that support 'gestures', all of these are considered to be single level—that is to say they are all handled at the same priority, and do not deal with a hierarchical set of gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to techniques for implementing a gesture engine.

According to one implementation, a method is provided for manipulating graphic objects in response to one or more gestures provided with a user interface device. A hierarchical tree of graphic objects is indicated with a display, and the gestures are associated with one or more of the graphic objects. Indications of the gestures are received from the user interface device. An indication of a portion of the graphic objects that may be associated with the one or more received gestures indications is provided along with an indication of a selection of the graphical objects. The graphical objects are selected from the graphic objects that may be associated with the received indication of the one or more gestures. A determination of an action based on the received gesture indications is made. An indication is provided when one of the one or more gestures associated with one of the graphics objects (also referred to as a visual object when shown on a display) is to use the determined action. Others of the gestures are locked out from using the determined action with other graphic objects. The selected graphic objects are manipulated on the display based on the indication that one gestures associated with one of the graphics objects is to use the determined action.

According to another implementation, a device for manipulating graphic objects is provided. The device includes a display to indicate graphic objects, a user interface device to receive one or more gestures and a memory. The memory contains instructions, which when executed by a processor indicate the graphic objects with the display. The instructions, when executed by a processor, receive an indication of the gestures from the user interface device and determine an action based on the received gesture indications. An indication is provided when one of the one or more gestures is to use the determined action with one of the graphics objects and other of the gestures are to be locked out from using the determined action with other of the graphic objects. The instructions, when executed by a processor, may also manipulate the selected graphic objects on the display based on the indication that one of gestures is to use the determined action with one of the graphics objects. In one implementation, the gestures belonging to a common category can use the determined action and other gestures that belong to a different category are locked out from using the determined action.

Various examples of the gesture engine are described below with reference to FIGS. 1-7.

Figure 1:
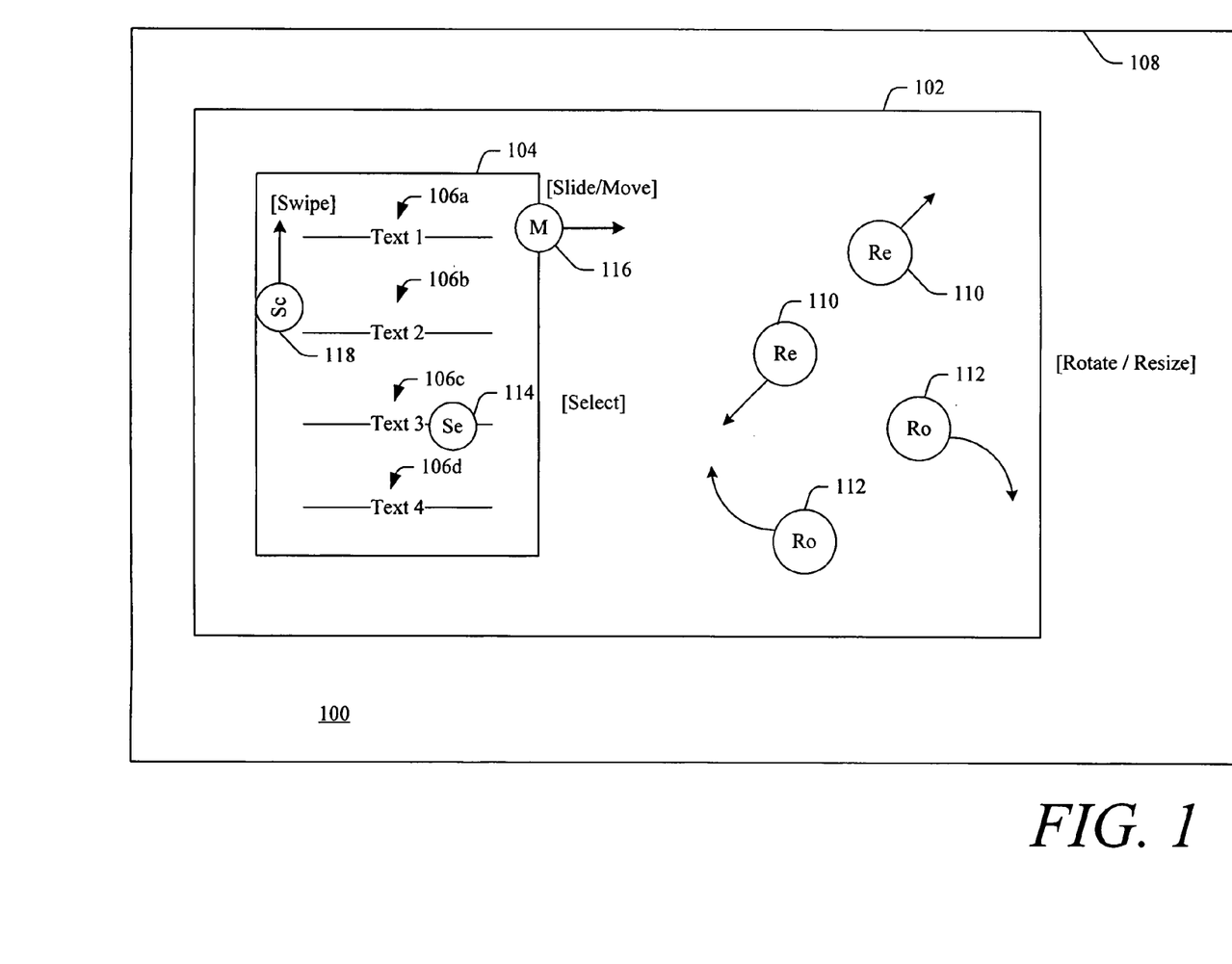
FIG. 1 is an example diagram of graphic objects being manipulated on a display in response to user generated gestures.

FIG. 1 illustrates an exemplary diagram 100 in which there are shown exemplary graphic objects 102, 104, and 106a-d being manipulated on a display 108 in response to user generated gestures 110, 112, 114, 116, and 118. Graphic objects, in one implementation, include window object 102, small window object 104, and text objects 106a-106d. Display 108 may be any type of display including an LED, or LCD disposed on a computer monitor, laptop or notebook computer, PDA or cell phone.

A gesture is considered to be one or more device down/movements/up sequences (known as Gesture Actions) with an input device (for example a touch screen, surface, stylus, voice or mouse) interpreted via a given set of rules regarding the movements(s) properties, for example its angle, interaction points, target/source visual objects, velocity, length of time etc. Each gesture is considered to be in one of two types: a Single Action (where only one action is required to implement—for example the slide above only requires a single input to be tracked), or Multiple action—where more than one Action/Input is required—for example the pinch gesture. Exemplary gestures that are shown in FIG. 1, include the following:

Resize gesture 110, which is implemented by a two action pinch/expand gesture using two fingers.

Rotate gesture 112, which is implemented by a two action angle rotate gesture using two fingers.

Select gesture 114, which is implemented by a one action touch and release using a finger.

Slide/Pan gesture 116, which is implemented by a directional single action using a finger.

Swipe gesture 118, which is implemented by a fast directional single action using a finger.

Examples of other gestures (not shown) include:

A move gesture, which is implemented as a single action repositioning.

A Select and hold gesture, which is implemented as a one action touch that extends over a certain period of time.

A spin gesture, which is implemented as an angled single action rotation.

A two finger pan gesture, which is implemented as a two finger directional action.

A drag/rip gesture, which is implemented as a single action move over a certain directional tolerance.

A command/user defined gesture, which for example implements an erase function. The erase function may be implemented by holding a user defined series of point samples.

A 3D Rotate gesture, which is implemented with a three finger action where two actions are the origin of the rotate and the third action acts as the move of the axis.

Although gestures are described being used on one or two fingers, it is contemplated the implementations of one finger gestures may be implemented with two or more fingers, and the two finger gestures may be implemented with either one finger or three or more fingers.

Example System Architecture

Figure 2:
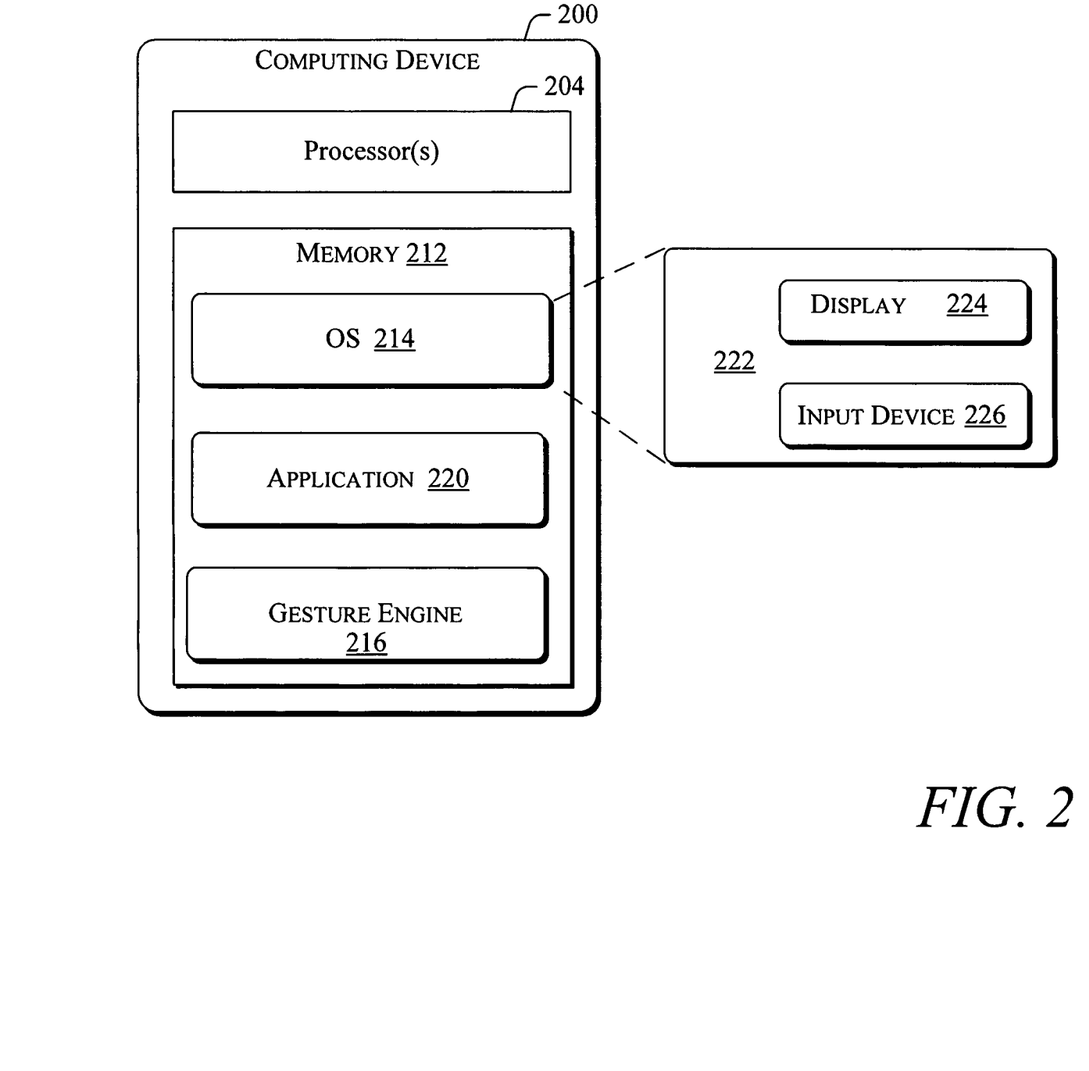
FIG. 2 is a simplified block diagram of an exemplary computer system for manipulating graphic objects with a gesture engine.
Figure 4:
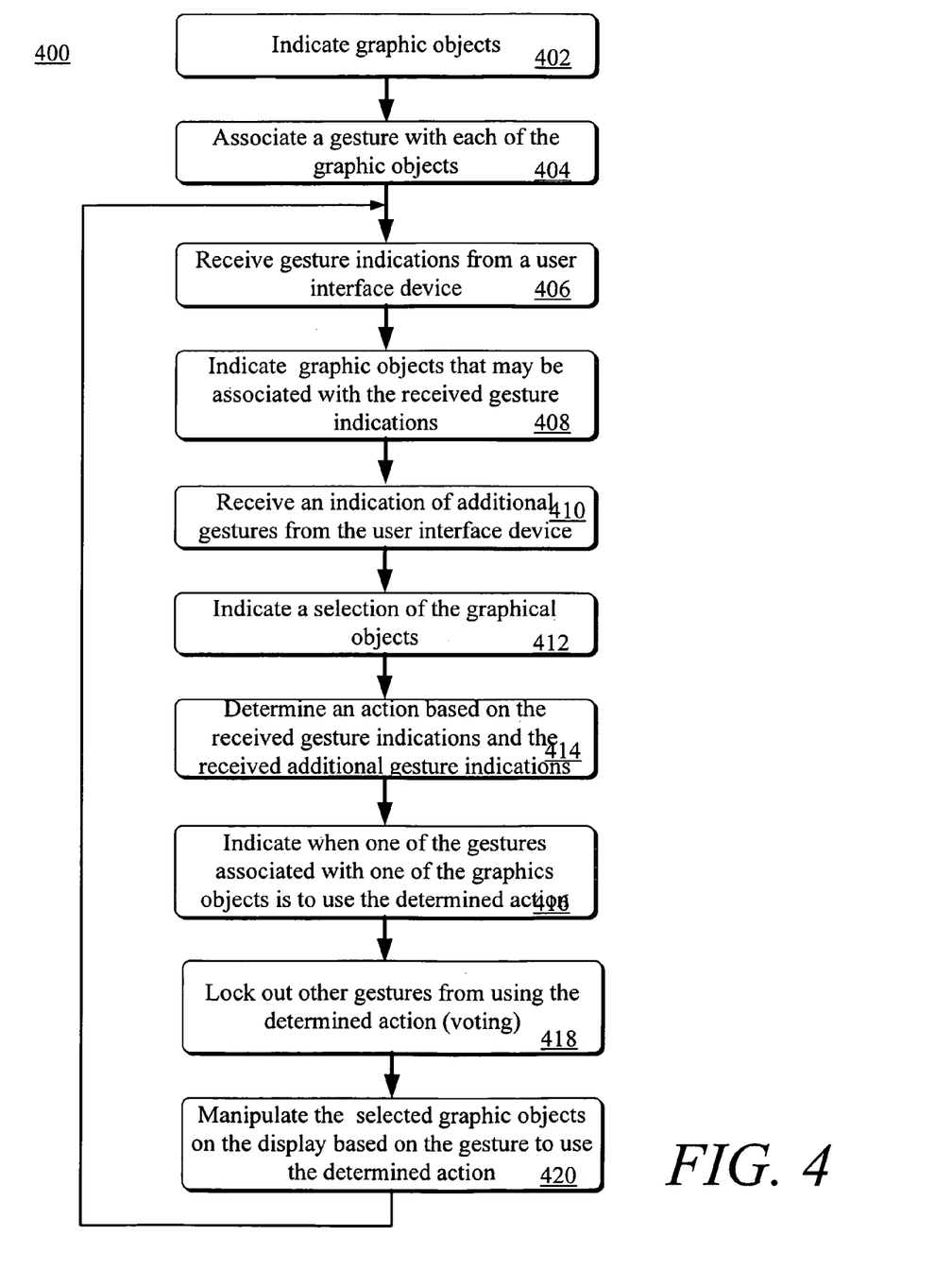
FIG. 4 is a flow diagram of an exemplary process used to implement the gesture engine.
Figure 5:
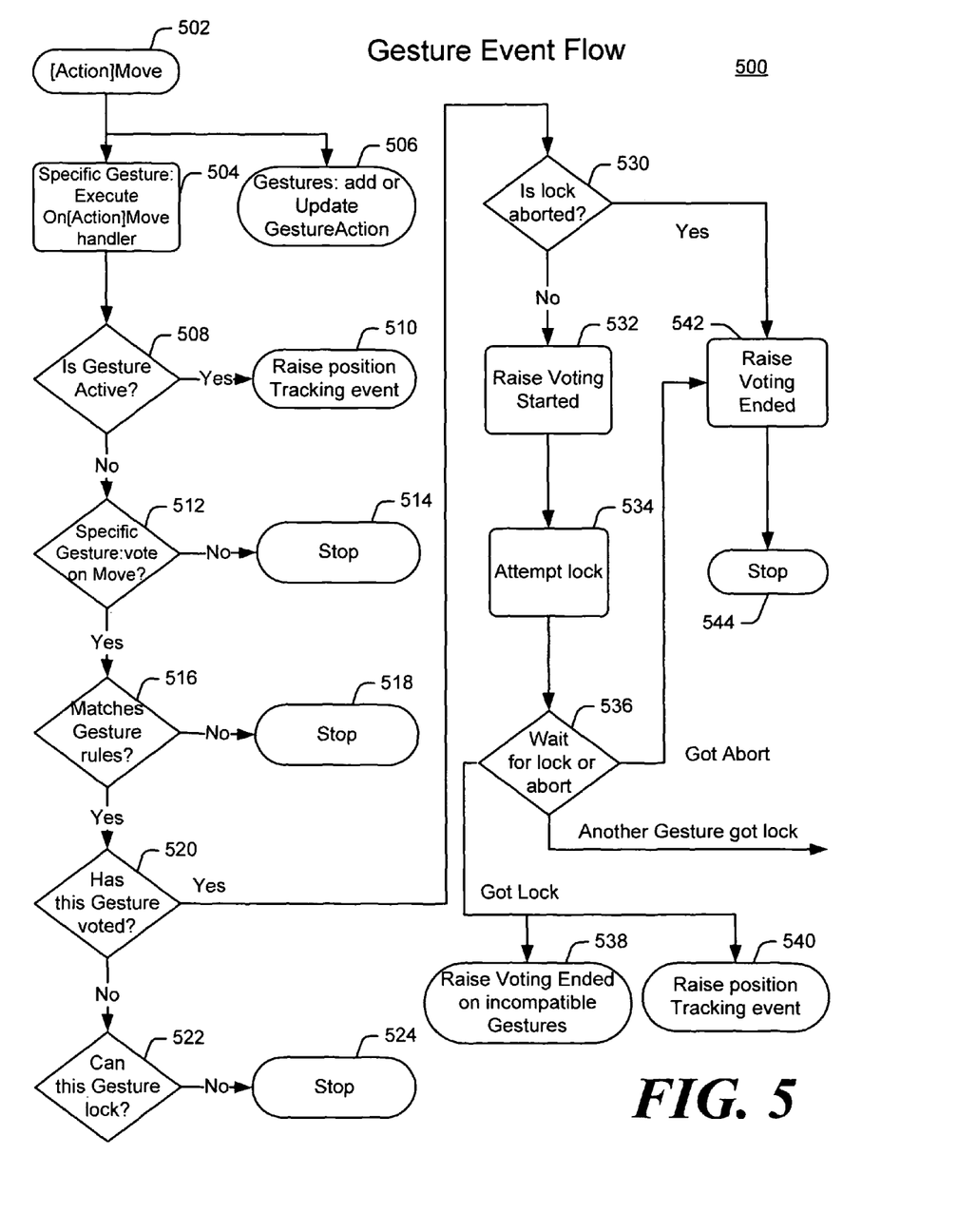
FIG. 5 is a flow diagram of an exemplary gesture event flow process used to lock out other gestures from using a determined gesture action for a user input device contact or move event.
Figure 6:
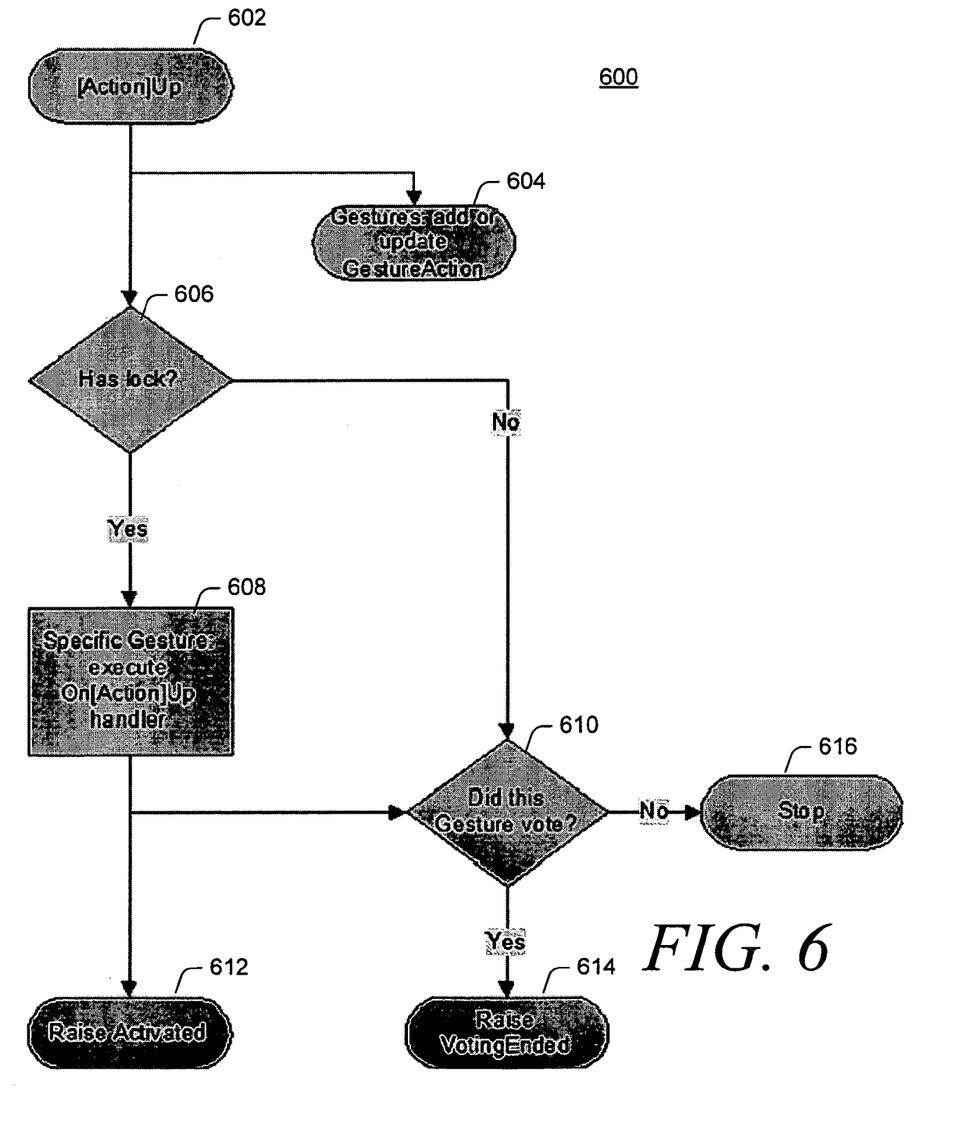
FIG. 6 is a flow diagram of a continuation of exemplary gesture event process used to lock out other gestures from using a determined gesture action for a user input device contact up event.

In FIG. 2 are illustrated selected modules in computing device 200 using processes 400, 500 and 600 shown in FIGS. 4-6. Computing device 200 includes a processor 204 coupled with memory 212 (also referred to a computer readable store device) and user interface device 222. Disposed within user interface device 222 are a display 224 and an input device 226 (for example a touch screen, surface, stylus or mouse).

The memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system. Processor 204 executes instructions that are stored in memory 212. Examples of instructions that are stored in memory 212 are described in FIGS. 4-6.

Stored in memory 212 of the computing device 200 are operating system 214 (Such as a Window® Vista, XP, Linux, Apple® or other Windows based operating system), gesture engine 216 and software application 220.

Figure 3:
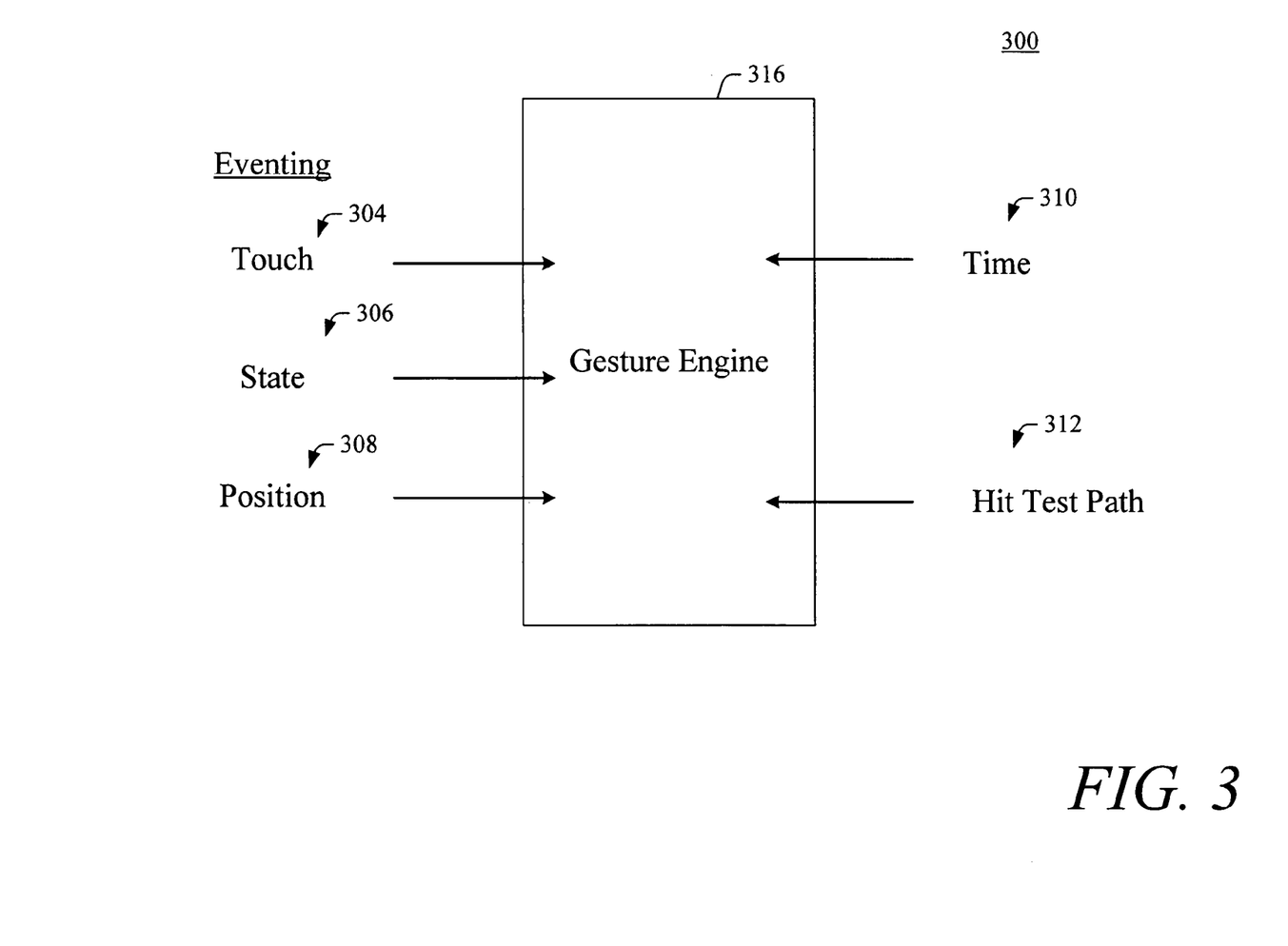
FIG. 3 is a simplified block diagram of inputs to the gesture engine

Illustrated in FIG. 3 is a diagram 300 showing user inputs indications generated by the input device and other input indications being received by the gesture engine 316 (Gesture engine 216 in FIG. 2). Inputs may include a touch indication 304, a state indication 306, a position indication 308, a time indication 310 or a hit test path collection 312.

The touch indication 304 may denote a User Identification (UID). The state indication 306 may denote an up move, or a sideways movement made by the user with the input device (such as an appendage of the user). Position indication 308 may indicate a user's current position on the display or current position on the input device. The time indication 310 may be used to track a time between gestures or the time of a gesture action. The hit test path collection 312 may denote a collection of graphic object locations under the current position indicated by the user on the input device.

Illustrated in FIGS. 4-6, are a flow diagram of a processes 400, 500 and 600 to manipulate graphics object in response to gestures. The exemplary process in FIGS. 4-6 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 2-FIG. 3, although it may be implemented in other system architectures.

FIG. 4 shows the process 400 used by the graphics engine to manipulate graphics object in response to gestures. Process 400 uses the processor, memory and modules shown in FIG. 2.

In block 402, an indication of a hierarchy of graphics objects are displayed on display 224. Gestures are then associated with one or more of the graphics objects in block 404. Such association may be initially programmed into the gesture engine and may then be modified during operation of the gesture engine.

In block 406, a gesture indication may be received from the user interface device. Upon receiving the gesture indication, an indication may also be provided that signifies that the gesture indication has begun to be received.

In block 408, an indication of graphics objects that may be associated with the received gesture indications is provided. Optionally, in block 410 an indication of additional or secondary gestures may be received from the user interface device. An indication may also be provided indicating that a gesture has ended upon receiving the received additional gesture indication. Alternately an indication may be provided that the gesture has ended upon completion of the first gesture, such as when a user removes their finger from a touch panel display.

In block 412 and indication of a selection of one of the graphical objects is provided. The graphical may be selected from graphic objects that may be associated with the received indication of one or more gestures and that are also associated with the received indication of the one or more additional gestures.

In block 414, a determination is made of an action (or a gesture action) based on the received gesture indication. In one implementation, the determination may be made based on the received gesture indication and the received additional gestured indications. Determining of the action may include selecting an action from a list of categories. This list of categories may include a Select, a Matrix, and a Union category. The Matrix category may include a list of actions such as Move, Resize, Rotate, Swipe, Spin, and Slide/Pan. The Select category may include a list of actions such as Select, and "Select and Hold". The Union category may include a list of actions such as Scatter View manipulation, and "Drag and Drop". Although a Select, Matrix and Union category are described, other categories may be used. Further any of the items in the list of actions for any of the categories may be re-assigned to another category. The user application can also override or further refine the categories of the gestures.

In block 416, an indication may be provided to indicate when one of the gestures associated with one of the graphics objects is to use the determined action. In block 418, the other gestures may be locked out from using the determined action using a voting process. The details of this voting process are described in FIGS. 5 and 6. The other gestures may be locked out if the gestures are not in the same category as the determined action. For example if the determined action is in the Matrix category, all gestures associated with the Union category may be locked out from using the gesture.

In block 420, the selected graphic objects are manipulated on the display based on the indication that one of the gestures associated with one of the graphics objects is to use the determined action. In one implementation, the manipulation may be made by ranking a listing of the actions in the action category using a predetermined ranking order, and then selecting the action categories with the highest ranking.

After completing block 420, the process then repeats at block 406 when a new gesture indication is received from the user interface device.

FIG. 5 discloses a flow diagram of a process used to lock out other gestures from manipulating graphics objects. This process is performed by allowing voting by the gesture objects. Voting is a special UI event model to allow the host application to show adorners or hints in the user interface. Voting has three stages: 1) voting is started, such as when gestures that are movement based, for example a slide where an action may be used as part of the move; 2) voting is locked, such as when a gesture action(s) are consumed by a gesture; and 3) voting has ended, such as when a gesture that uses voting started ends, or where a gesture belonging to an incompatible gesture category voted, but is now locked out.

The following details the Event Flow process 500 shown in FIG. 5 and process 600 shown in FIG. 6 for an exemplary MouseDown, ContactDown and StylusDown (collectively [Action]Down) and MouseMove, ContactMove, and StylusMove (collectively [Action]Move) gestures. Both down and move are handled in very similar manner.

In block 502, the Gesture Engine receives an [Action]Down/[Action]Move event indication (e.g. a Gesture action indication) on a User Interface Element (UIElement or user interface device) with one or more gesture indications (also referred to as Gestures herein) attached to the indication.

In block 504, a gesture handler for the Gesture executes it's On[Action]Down/On[Action]Move event handler.

In block 506, the gesture engine adds or updates the GestureAction associated with this contact's ID (or UID on the interface device).

In block 508, ([Action]Move only) the gesture handler for the Gesture determines whether or not it is already locked and active. If it is already locked and active, the handler raises a position tracking event ([Action]Move only) in block 510 and stops. Otherwise the handler moves on to GestureAction evaluation in block 512.

In block 512, the gesture handler for the Gesture determines whether or not it should vote on an [Action]Down/[Action]Move event. For example, GestureClick can vote on Down while StndSlide (Standard Slide) does not. If this gesture handler for the Gesture does not vote on this event in block 512, the flow stops in block 514.

If the flow does not stop, in block 516, the gesture handler for the Gesture compares the content of the GestureAction to its own internal set of matching rules to determine whether or not the GestureAction is intended to be this Gesture. For example, if a GestureClick has a DiffX and DiffY property set, a GestureAction that moved beyond the bounds of the DiffX or DiffY would not be a GestureClick and therefore GestureClick would not vote on it and the process continues on block 520. If the gesture handler for the Gesture determines that the GestureAction does not match its rules the flow stops in block 518.

In block 518, the gesture handler for the Gesture determines whether or not it has already voted on this GestureAction. If the gesture has already voted, the process moves to block 530.

In block 522, the gesture handler for the Gesture checks to see if it is able to lock the GestureAction. If it is unable to lock the GestureAction the flow stops in block 524 or else the process continues in block 530.

In block 522, the gesture handler for the Gesture allows the host application to check to see if the lock should be aborted by the client application. If the lock was aborted, the gesture handler for the Gesture raises a VotingEnded event for that gesture action and the flow stops.

In block 530, the gesture handler for the Gesture determines if the lock has been aborted and votes on the GestureAction. If the lock has not been aborted, a VotingStarted event is initiated in block 532 or else the process proceeds to block 542.

In block 534, the gesture handler for the Gesture tries to lock the GestureAction. This attempted locking of the GestureAction is an asynchronous process since all other Gestures (that are members of incompatible GestureGroups) voting on the same GestureAction must eliminate themselves (and raise voting ended events) before one GestureGroup can achieve a lock.

In block 536, the gesture handler for the Gesture will receive either an instruction to abandon the lock (due to an abort or because another gesture got the lock) or it will get the lock in blocks 538 and 540. If the gesture handler for the Gesture abandons the lock, the gesture handler for the Gesture raises the VotingEnded event in block 542 and the flow stops in block 544.

If the gesture handler for the Gesture received the lock, the GestureEngine raises the VotingEnded event on all other incompatible Gestures in block 538. Once the GestureEngine raises the VotingEnded event on all other incompatible Gestures in block 538, this gesture handler for the Gesture and other members of the same GestureGroup have exclusive rights to use this GestureAction.

In block 540, the gesture handler for the Gesture raises a position tracking event.

Referring to FIG. 6, the following details the Event Flow process 600 for MouseUp, ContactUp and StylusUp (collectively [Action]Up).

In block 602, the Gesture Engine receives an [Action]Up event on a UIElement with one or more Gestures attached to it.

In block 604, the GestureEngine adds or updates the GestureAction associated with this contact's ID (or UID).

In block 606, the gesture handler for the Gesture checks to see if it owns the lock for this GestureAction. If it does not owns the lock for this GestureAction, the flow skips to block 610.

In block 608, the gesture handler for the Gesture executes it's On[Action]Up event handler. The gesture handler than proceeds to block 610 and 612.

In block 612, the gesture handler for the Gesture raises the Activated event.

In block 610, the gesture handler for the Gesture determines whether or not it voted on this GestureAction. If it voted on this GestureAction, then the gesture handler for the Gesture raises the VotingEnded event. The process then proceeds to block 614 where VotingEnding event is raised and the flow stops. If it did not vote on this GestureAction, the flow stops without raising the VotingEnded event in block 616.

Figure 7:
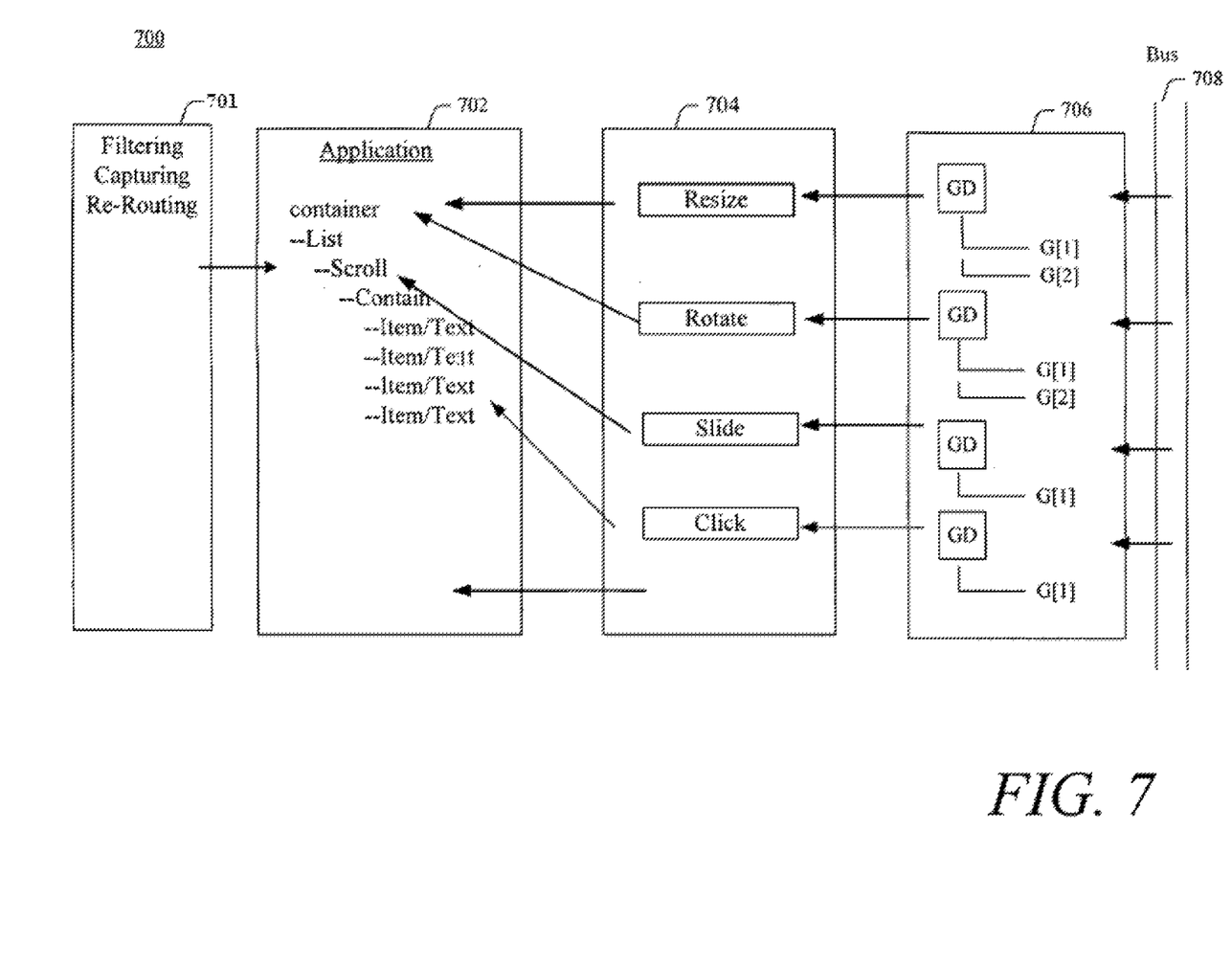
FIG. 7 is a diagram of exemplary interfaces for an application and the gesture engine.

FIG. 7 shows a diagram of a model 700 of a gesture engine interaction with an application.

The model includes a Filtering, Capturing and Re-routing model 701 that interacts with an application 702 (application 220 in FIG. 2).

Filtering is a process by which the gesture engine may explicitly not pass a given input event (such as mouse down/move/up) to the host application for processing in the normal manner, based on its usage within an active gesture.

Capture is a process by which gestures continue receiving the input events (such as mouse down/move/up) after the input device context has left the graphical object associated with the gesture. Multiple gestures can 'capture' (that is to say continue to receive these input events), and these input events are routed to each gesture in the order of the visual hierarchy of the graphical objects that registered them.

Re-routing is a process by which a input event is wrongly received by a gesture, and is then passed to the gesture that has an active lock on that gesture action.

Gestures 704 are provided to application 702 after being selected by gesture engine 706 (gesture engine 216 in FIG. 2). Gesture engine 706 receives gesture indications and gesture actions (Designated as G[I] and G[2]) from a user interface device (not shown) via bus 708.

Gestures or Gesture Data (GD) exist on the routed event visual tree—either on a bubble or a tunnel in gesture engine 706 to accept input events (also referred to as gesture actions) from the mouse, stylus (Windows7) and contact system (surface) via bus 708. Multiple gestures or GDs in a support gestures collection are processed in gesture definition order by gesture engine 706.

The gesture engine 706 re-routes these input events from bus 708 to all logical 'captures' in gesture block 704 as required (It implements a complex multi-element capture system). Gesture engine converts these gesture actions to Gestures that are then fed to Application 702. Examples of such gestures are shown in gesture block 704. These examples include Resize, Rotate, Slide and Click gestures, other gestures may be included in gesture block such as the gestures described in connection with FIG. 1. The gestures may be associated with graphic objects in the application 702. In one implementation, the Resize and Rotate are associated with the container in the application 702. The slide gesture may be associated with the Scroll function, and the click gesture may be associated with individual items or text.

The gesture engine 706 also manages actions both on a local level (for points, velocity and elements), but also at a single level for locking (A lock on one action will lock that action on all parts of the gesture tree).

In one implementation the Gesture engine may be extendable. The given set of gestures may well change over time. By allowing gestures to have a separate method to cooperate; it becomes possible to extend the gesture set without breaking any of the existing gestures defined in an application.

In another implementation that gesture engine may enable re-use. By allowing gestures to be implemented at a specific application defined control level (for example to 'slide or pan' through a list of items), and allowing the gestures to cooperate with other gestures on either parent or sibling controls: It becomes easier to implement a standard template patter; therefore encouraging reuse of gestures with a given application domain.

In a further implementation, the gesture may be extensible. New gestures can be created, whilst cooperating with the existing gestures. For example adding $3^{rd}$ finger $3d$ rotates does not break other gestures such as a two finger rotate.

The Gesture engine may have a deep eventing model that allows the application programmer to know when it 'might' be for a given gesture (start voting event); it is for me (locked event), gesture specific events (e.g. a pan progress), an end voting event, and an activated or completed event. This allows custom, and complex, visual cues to be added to an application.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for manipulating graphic objects in response to at least one of a plurality of gestures provided through a user interface device, the method comprising:

displaying, on a display of the user interface device, a hierarchical visual tree comprising a plurality of graphic objects;

associating the plurality of gestures with a plurality of gesture handlers of a gesture engine of the user interface device, each of the plurality of gesture handlers being a unique gesture handler and having a unique internal set of matching rules;

receiving a portion of one or more gestures of the plurality of gestures, at the user interface device, the one or more gestures of the plurality of gestures being input through an input device at the user interface device;

in response to receiving the portion of the one or more gestures of the plurality of gestures at the user interface device, receiving one or more gesture indications, in the gesture engine, corresponding to the one or more gestures, in response to receiving the one or more gesture indications in the gesture engine:
indicating that the one or more gesture indications have begun to be received;
indicating, on the display, a portion of the plurality of graphic objects that may be associated with the one or more received gesture indications; and
separate from indicating the portion of the plurality of graphic objects that may be associated with the one or more received gesture indications, indicating a selection of one or more of the plurality of graphic objects, at least one of the selected one or more of the plurality of graphic objects selected from the portion of the plurality of graphic objects that may be associated with the one or more received gesture indications;

determining, through the plurality of gesture handlers, a plurality of gesture actions based on the one or more received gesture indications, by each of the plurality of gesture handlers comparing a content of each of the received one or more gesture indications to each unique internal set of matching rules of each respective gesture handler of the plurality of unique gesture handlers, one or more of the plurality of gesture actions indicating, on the display, a manipulation of one or more of the plurality of graphic objects;
wherein the determining through the plurality of gesture handlers the plurality of gesture actions comprises selecting with the at least one of the plurality of gesture handlers a gesture action from a list of action categories consisting of: a Select, a Matrix, and a Union category;

wherein the Matrix category includes a list of actions comprising at least one of: Move, Resize, Rotate, Swipe, Spin, and Slide/Pan, wherein the Union category comprises a list of actions comprising at least one of: ScatterView manipulation, and Drag and Drop, and wherein any action in the list of actions for any of the action categories may be re-assigned to another action category;

indicating, through two or more of the plurality of gesture handlers, to other of the plurality of gesture handlers, that the two or more of the plurality of gesture handlers are to use one of the plurality of gesture actions that has been determined by the plurality of gesture handlers to manipulate, on the display, at least one of the selected one or more of the plurality of graphic objects;

indicating, through a second one of the two or more of the plurality of gesture handlers, to the other of the plurality of gesture handlers including a first one of the two or more of the plurality of gesture handlers, that the second one of the two or more of the plurality of gesture handlers is not to use one of the plurality of gesture actions that has been determined by the plurality of gesture handlers to manipulate the at least one of the selected one or more of the plurality of graphic objects, wherein the first one of the two or more of the plurality of gesture handlers is distinct from the second one of the two or more of the plurality of gesture handlers;

locking out, through the first one of the two or more of the plurality of gesture handlers, the other of the plurality of gesture handlers including the second one of the two or more of the plurality of gesture handlers, from using the determined gesture action to manipulate, on the display, other of the plurality of graphic objects, in response to the second one of the two or more of the plurality of gesture handlers providing an indication to the other of the plurality of gesture handlers that the other of the plurality of gesture handlers are not to use the determined gesture action; and manipulating the one or more selected graphic objects on the display with the first one of the two or more of the plurality of gesture handlers, based on the indication that first one of the two or more of the plurality of gestures handlers associated with one of the plurality of gestures is to use the determined gesture actions and in response to the first one of the two or more of the plurality of gesture handlers locking out the other of the plurality of gesture handlers including the second one of the two or more of the plurality of gesture handlers;

wherein the manipulating of the one or more selected graphic objects on the display with the first one of the two or more of the plurality of gesture handlers comprises:

ranking a listing of the action categories used to manipulate a graphics object in the action category using a predetermined ranking order of the gesture actions, and selecting the action categories with a highest ranking to manipulate one or more of the selected graphics objects;

wherein the indicating of the portion of the plurality of the graphic objects comprises:

arranging the plurality of graphics objects in an order in the hierarchical visual tree, and indicating, with one of the plurality of gesture handlers, when one of the gestures associated with one of the plurality of graphic objects in the hierarchical visual tree uses the determined gesture action by showing corresponding adorners or hints on the display.

2. The method as recited in claim 1 wherein the locking out, through the first one of the two or more of the plurality of gesture handlers, the other of the plurality of gesture handlers from using the determined gesture action to manipulate the other of the plurality of graphic objects further comprises:

providing a lock out indication to the other of the plurality of gesture handlers to lock out other of the one or more of the plurality of gesture handlers from using the determined gesture action to manipulate the other of the plurality of graphic objects if one of the other of the plurality of gesture handlers provides an indication that a second determined action for the other one or more gestures are not part of an action category compatible with one of the plurality of determined actions.

3. The method as recited in claim 2 wherein the locking out of the other of the plurality of gesture handlers from using the one of the plurality of the determined gesture actions to manipulate the other of the plurality of graphic objects if one of the other of the plurality of gesture handlers provides an indication that the second determined action for the other of the plurality of gestures are not part of an action category compatible with the one of the plurality of determined action further comprises: locking out the other of the plurality of gesture handlers from using the determined action with the other of the plurality of graphic objects if a second determined action for the other of the plurality of gestures are not part of an action category identical to the determined action.

4. The method as recited in claim 1 further comprising:

adding one or more additional gestures handlers that compare the content of the received one or more gesture indications to the unique internal set of matching rules of the added one or more additional gesture handlers after the one or more additional gesture handles have been installed, and associating the added one or more addition gestures handlers with one or more of the plurality of graphic objects and at least one of the plurality of gestures.

5. The method as recited in claim 1 further comprising:

receiving one or more additional gesture indications from the user interface device;

indicating a selection of the one or more graphic objects, the graphic objects being selected from the plurality of graphic objects that may be associated with the one or more received gesture indications and that are also associated with the received one or more additional gesture indications; and determining an action based on a combination of at least one of the received gesture indications and the received additional gesture indications.

6. The method as recited in claim 1, wherein the plurality of gesture handlers include: (i) a first set of gesture handlers that respond to a first class of gestures, and (ii) a second set of gesture handlers that respond to a second class of gestures, and wherein locking out the other of the plurality of gesture handlers from using the determined action includes:

indicating, to the second set of gesture handlers, by at least one of the first set of gesture handlers, at least one of the second set of gestures to be locked out; and indicating, to the first set of gesture handlers, by at least one of the second set of gesture handlers, at least one of the first set of gestures to be locked out from manipulating at least one of a size, a position or an orientation of at least one of the plurality of graphics objects on the display.

7. The method of claim 1, wherein locking out, with the first one of the two or more of the plurality of gesture handlers, the other of the plurality of gesture handlers including the second one of the two or more of the plurality of gesture handlers from using the determined gesture action to manipulate the other of the plurality of graphic objects on the display in response to the second one of the two or more of the plurality of gesture handlers providing the indication to the other of the plurality of gesture handlers that the other of the plurality of gesture handlers are not to use the determined gesture action includes:

locking out with the first one of the two or more of the plurality of gesture handlers, the other of the plurality of gesture handlers including the second one of the two or more of the plurality of gesture handlers from using the determined gesture action to manipulate a size, an orientation, or a position of the plurality of graphic objects on the display in response to the second one of the two or more of the plurality of gesture handlers providing the indication to the other of the plurality of gesture handlers that the other of the plurality of gesture handlers are not to use the determined gesture action.

8. A non-transitory computer readable medium comprising computer executable instructions for manipulating, with a gesture engine that includes a plurality of gesture handlers, graphic objects in response to at least one of a plurality of gestures generated through a user interface device, the computer-executable instructions when executed by one or more processors, perform acts comprising:

displaying, on a display of the user interface device, a hierarchical visual tree comprising a plurality of graphic objects;

associating the plurality of gestures with the plurality of gesture handlers of the gesture engine of the user interface device, each of the plurality of gesture handlers being a unique gesture handler and having a unique internal set of matching rules;

receiving a portion of one or more gestures of the plurality of gestures, at the user interface device, the one or more gestures of the plurality of gestures being input through an input device at the user interface device;

in response to receiving the portion of the one or more gestures of the plurality of gestures at the user interface device, receiving one or more gesture indications, in the gesture engine, corresponding to the one or more gestures,     in response to receiving the one or more gesture indications in the gesture engine:

indicating that the one or more gesture indications have begun to be received;

indicating, on the display, a portion of the plurality of graphic objects that may be associated with the one or more received gesture indications; and         separate from indicating the portion of the plurality of graphic objects that may be associated with the one or more received gesture indications, indicating a selection of one or more of the plurality of graphic objects, at least one of the selected one or more of the plurality of graphic objects selected from the portion of the plurality of graphic objects that may be associated with the one or more received gesture indications;

determining, through the plurality of gesture handlers, a plurality of gesture actions based on the one or more received gesture indications, by each of the plurality of gesture handlers comparing a content of each of the received one or more gesture indications to each unique internal set of matching rules of each respective gesture handler of the plurality of unique gesture handlers, one or more of the plurality of gesture actions indicating, on the display, a manipulation of one or more of the plurality of graphic objects;

wherein the determining through the plurality of gesture handlers the plurality of gesture actions comprises selecting with the at least one of the plurality of gesture handlers a gesture action from a list of action categories consisting of: a Select, a Matrix, and a Union category;

wherein the Matrix category includes a list of actions comprising at least one of: Move, Resize, Rotate, Swipe, Spin, and Slide/Pan,         wherein the Union category comprises a list of actions comprising at least one of: ScatterView manipulation, and Drag and Drop, and         wherein any action in the list of actions for any of the action categories may be re-assigned to another action category;

indicating, through two or more of the plurality of gesture handlers, to other of the plurality of gesture handlers, that the two or more of the plurality of gesture handlers are to use one of the plurality of gesture actions that has been determined by the plurality of gesture handlers to manipulate, on the display, at least one of the selected one or more of the plurality of graphic objects;

indicating, through a second one of the two or more of the plurality of gesture handlers, to the other of the plurality of gesture handlers including a first one of the two or more of the plurality of gesture handlers, that the second one of the two or more of the plurality of gesture handlers is not to use one of the plurality of gesture actions that has been determined by the plurality of gesture handlers to manipulate the at least one of the selected one or more of the plurality of graphic objects, wherein the first one of the two or more of the plurality of gesture handlers is distinct from the second one of the two or more of the plurality of gesture handlers;

locking out, through the first one of the two or more of the plurality of gesture handlers, the other of the plurality of gesture handlers including the second one of the two or more of the plurality of gesture handlers, from using the determined gesture action to manipulate, on the display, other of the plurality of graphic objects, in response to the second one of the two or more of the plurality of gesture handlers providing an indication to the other of the plurality of gesture handlers that the other of the plurality of gesture handlers are not to use the determined gesture action; and     manipulating the one or more selected graphic objects on the display with the first one of the two or more of the plurality of gesture handlers, based on the indication that first one of the two or more of the plurality of gestures handlers associated with one of the plurality of gestures is to use the determined gesture actions and in response to the first one of the two or more of the plurality of gesture handlers locking out the other of the plurality of gesture handlers including the second one of the two or more of the plurality of gesture handlers;

wherein the manipulating of the one or more selected graphic objects on the display with the first one of the two or more of the plurality of gesture handlers comprises:

ranking a listing of the action categories used to manipulate a graphics object in the action category using a predetermined ranking order of the gesture actions, and selecting the action categories with a highest ranking to manipulate one or more of the selected graphics objects;

wherein the indicating of the portion of the plurality of the graphic objects comprises:
arranging the plurality of graphics objects in an order in the hierarchical visual tree, and
indicating, with one of the plurality of gesture handlers, when one of the gestures associated with one of the plurality of graphic objects in the hierarchical visual tree uses the determined gesture action by showing corresponding adorners or hints on the display.

9. The non-transitory computer readable medium as recited in claim 8, further comprising adding additional gestures handlers and associating the added addition gestures handlers with at least one of the plurality of graphics objects.

10. The non-transitory computer readable medium as recited in claim 8, further comprising indicating a gesture begins upon receiving the received gesture and indicating when the gesture ends upon receiving the additional gesture.

11. A user interface device for receiving one or more gestures of a plurality of gestures, comprising:
a display to indicate graphic objects;
a processor; and
a memory containing instructions which when executed by the processor comprise:
displaying, on the display of the user interface device, a hierarchical visual tree comprising a plurality of graphic objects;
associating the plurality of gestures with a plurality of gesture handlers of a gesture engine of the user interface device, each of the plurality of gesture handlers being a unique gesture handler and having a unique internal set of matching rules;
receiving a portion of one or more gestures of the plurality of gestures, at the user interface device, the one or more gestures of the plurality of gestures being input through an input device at the user interface device;
in response to receiving the portion of the one or more gestures of the plurality of gestures at the user interface device, receiving one or more gesture indications, in the gesture engine, corresponding to the one or more gestures,
in response to receiving the one or more gesture indications in the gesture engine:
indicating that the one or more gesture indications have begun to be received;
indicating, on the display, a portion of the plurality of graphic objects that may be associated with the one or more received gesture indications; and
separate from indicating the portion of the plurality of graphic objects that may be associated with the one or more received gesture indications, indicating a selection of one or more of the plurality of graphic objects, at least one of the selected one or more of the plurality of graphic objects selected from the portion of the plurality of graphic objects that may be associated with the one or more received gesture indications;
determining, through the plurality of gesture handlers, a plurality of gesture actions based on the one or more received gesture indications, by each of the plurality of gesture handlers comparing a content of each of the received one or more gesture indications to each unique internal set of matching rules of each respective gesture handler of the plurality of unique gesture handlers, one or more of the plurality of gesture actions indicating, on the display, a manipulation of one or more of the plurality of graphic objects;
wherein the determining through the plurality of gesture handlers the plurality of gesture actions comprises selecting with the at least one of the plurality of gesture handlers a gesture action from a list of action categories consisting of: a Select, a Matrix, and a Union category;
wherein the Matrix category includes a list of actions comprising at least one of: Move, Resize, Rotate, Swipe, Spin, and Slide/Pan,
wherein the Union category comprises a list of actions comprising at least one of: ScatterView manipulation, and Drag and Drop, and
wherein any action in the list of actions for any of the action categories may be re-assigned to another action category;
indicating, through two or more of the plurality of gesture handlers, to other of the plurality of gesture handlers, that the two or more of the plurality of gesture handlers are to use one of the plurality of gesture actions that has been determined by the plurality of gesture handlers to manipulate, on the display, at least one of the selected one or more of the plurality of graphic objects;
indicating, through a second one of the two or more of the plurality of gesture handlers, to the other of the plurality of gesture handlers including a first one of the two or more of the plurality of gesture handlers, that the second one of the two or more of the plurality of gesture handlers is not to use one of the plurality of gesture actions that has been determined by the plurality of gesture handlers to manipulate the at least one of the selected one or more of the plurality of graphic objects, wherein the first one of the two or more of the plurality of gesture handlers is distinct from the second one of the two or more of the plurality of gesture handlers;
locking out, through the first one of the two or more of the plurality of gesture handlers, the other of the plurality of gesture handlers including the second one of the two or more of the plurality of gesture handlers, from using the determined gesture action to manipulate, on the display, other of the plurality of graphic objects, in response to the second one of the two or more of the plurality of gesture handlers providing an indication to the other of the plurality of gesture handlers that the other of the plurality of gesture handlers are not to use the determined gesture action; and
manipulating the one or more selected graphic objects on the display with the first one of the two or more of the plurality of gesture handlers, based on the indication that first one of the two or more of the plurality of gestures handlers associated with one of the plurality of gestures is to use the determined gesture actions and in response to the first one of the two or more of the plurality of gesture handlers locking out the other of the plurality of gesture handlers including the second one of the two or more of the plurality of gesture handlers;
wherein the manipulating of the one or more selected graphic objects on the display with the first one of the two or more of the plurality of gesture handlers comprises:

ranking a listing of the action categories used to manipulate a graphics object in the action category using a predetermined ranking order of the gesture actions, and selecting the action categories with a highest ranking to manipulate one or more of the selected graphics objects;

wherein the indicating of the portion of the plurality of the graphic objects comprises:

arranging the plurality of graphics objects in an order in the hierarchical visual tree, and indicating, with one of the plurality of gesture handlers, when one of the gestures associated with one of the plurality of graphic objects in the hierarchical visual tree uses the determined gesture action by showing corresponding adorners or hints on the display.

\* \* \* \* \*